Feb. 24, 1925.

O. P. NYSTROM 1,527,375

MACHINE FOR FORMING RECTANGULAR PIPE

Filed Feb. 5, 1923  8 Sheets-Sheet 1

Inventor
Oscar P. Nystrom
By Frank E. Liverance, Jr.
Attorney.

Feb. 24, 1925.

O. P. NYSTROM 1,527,375

MACHINE FOR FORMING RECTANGULAR PIPE

Filed Feb. 5, 1923     8 Sheets-Sheet 4

Inventor
Oscar P. Nystrom
By Frank E. Liverance, Jr.
Attorney.

Inventor
Oscar P. Nystrom
By Frank E. Liverance Jr
Attorney.

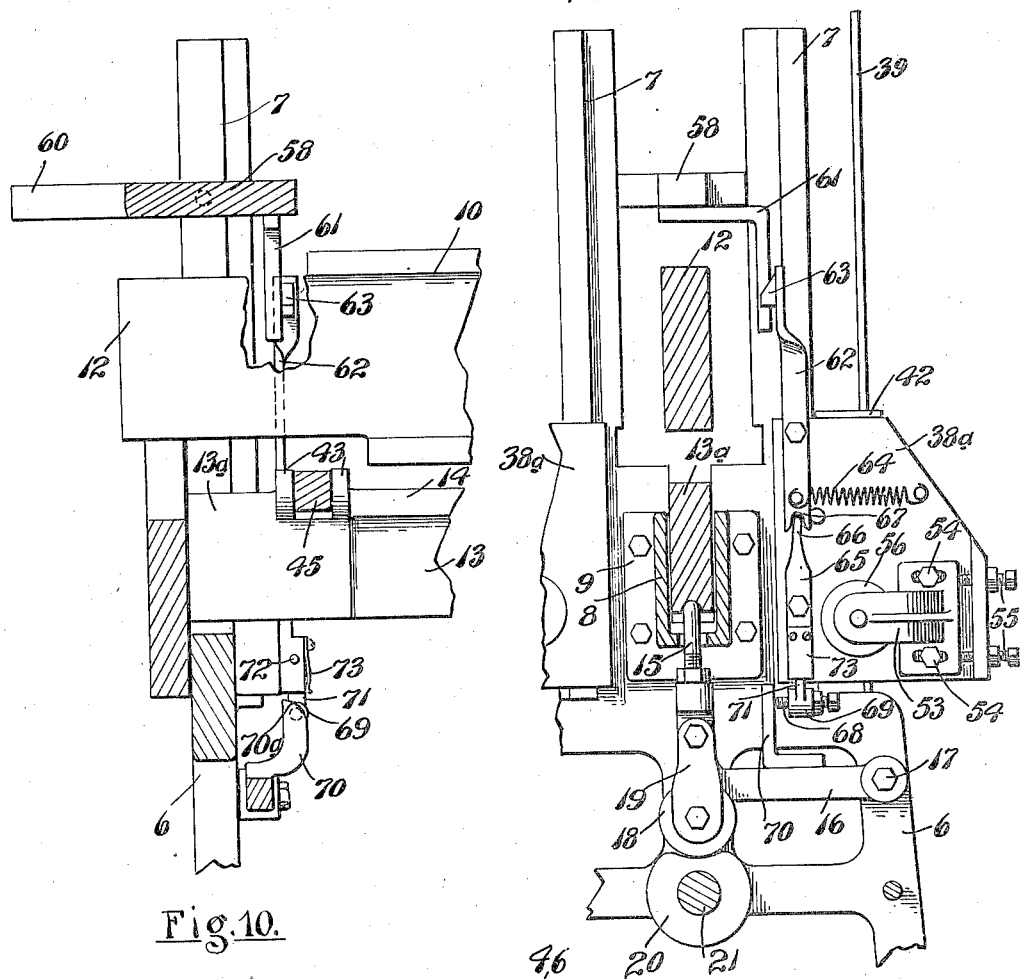
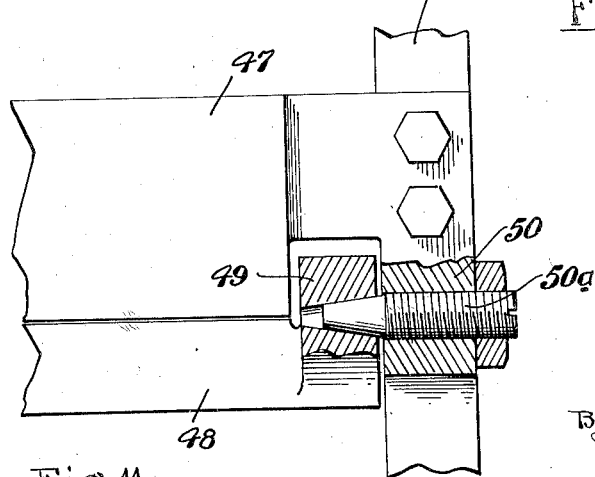

Patented Feb. 24, 1925.

1,527,375

UNITED STATES PATENT OFFICE.

OSCAR P. NYSTROM, OF HOLLAND, MICHIGAN, ASSIGNOR TO HOLLAND FURNACE COMPANY, OF HOLLAND, MICHIGAN, A CORPORATION OF MICHIGAN.

MACHINE FOR FORMING RECTANGULAR PIPE.

Application filed February 5, 1923. Serial No. 617,071.

*To all whom it may concern:*

Be it known that I, OSCAR P. NYSTROM, a citizen of the United States of America, residing at Holland, in the county of Ottawa and State of Michigan, have invented certain new and useful Improvements in Machines for Forming Rectangular Pipe; and I do hereby declare the following to be a full, clear, and exact description of the invention, such as will enable others skilled in the art to which it appertains to make and use the same.

This invention relates to a machine for making pipe sections, rectangular in cross section from sheet metal, one place where such pipe sections are particularly applicable being in furnace installation to carry hot air from the furnaces vertically in walls or partitions in houses, as in reaching upper rooms of a house. It is a primary object and purpose of the present machine to provide a construction with which flat sheets may be bent into rectangular form at one operation of the machine, greatly simplifying the manufacturing process and producing a product which is uniform in shape and not subject to the variations present where each bend in the pipe is made on a brake, as previously done in the manufacture of such pipe. My invention consists in the production of a machine for practically and effectively producing the pipe sections of rectangular cross section in quantity, many novel arrangements of parts and combinations of elements being used for this purpose, as will fully appear as understanding of the invention is had from the following description, taken in connection with the accompanying drawings, in which, Figure 1 is a front elevation of the machine of my invention.

Fig. 9 is a fragmentary vertical section adjacent one end of the machine and transversely thereof to show the means used for steadying and holding the free end of the form around which the pipe is bent, and the automatic control means for said steadying and holding means.

Fig. 10 is a fragmentary vertical section taken at right angles to the plane of Fig. 9, further illustrating said means.

Fig. 11 is a fragmentary plan, partly in section, showing a detail of the construction of certain of the forming bars.

Figure 12:
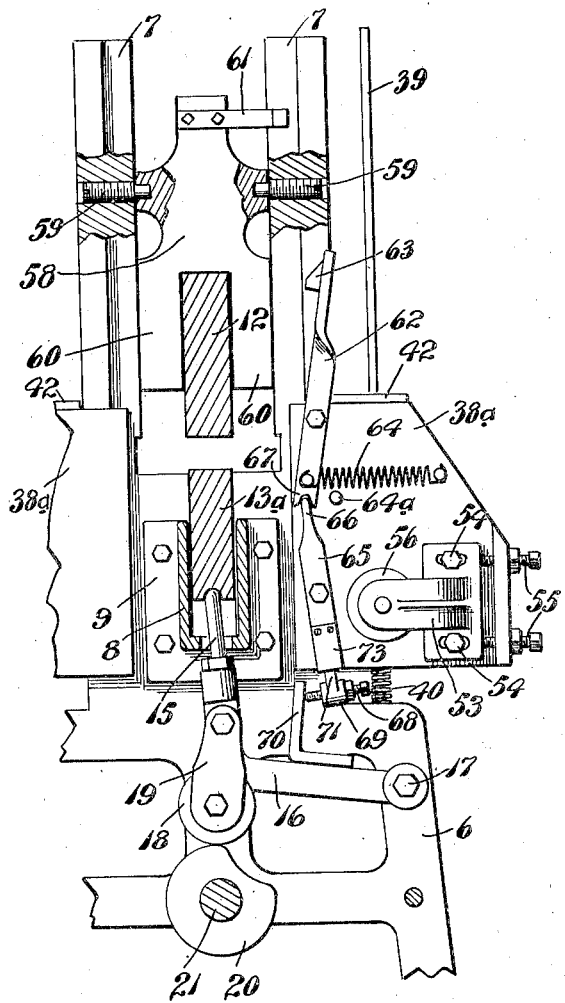
Figure 13:
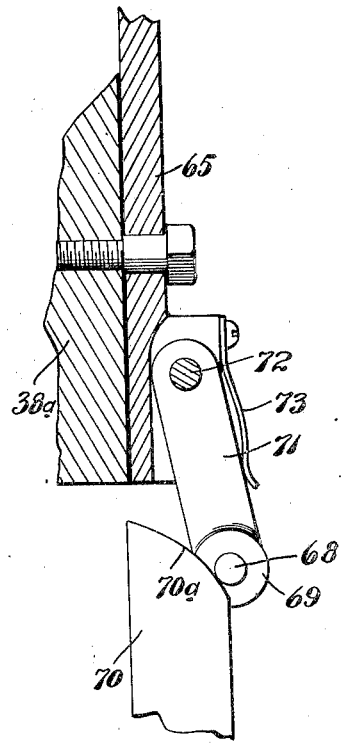

Fig. 12 is a view similar to that shown in Fig. 9 illustrating a different position of the parts such as they take immediately after the initiation of a cycle of pipe bending or forming operations, and Fig. 13 is a fragmentary detail in elevation and vertical section, showing one position of a control for latching means which in turn controls the movements and positions of the form steadying and holding means.

Like reference characters refer to like parts in the different figures of the drawings.

Figure 6:
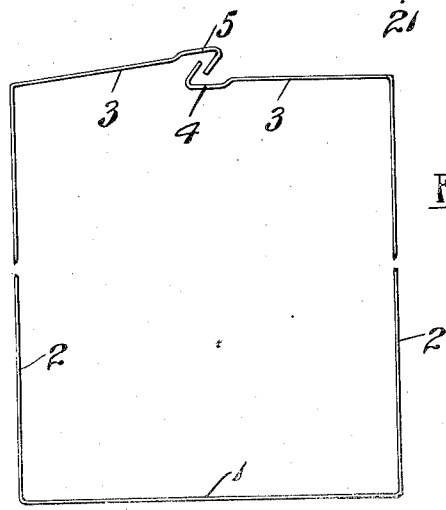
Fig. 6 is an end elevation of a pipe section as it appears after being formed in the machine.
Figure 8:
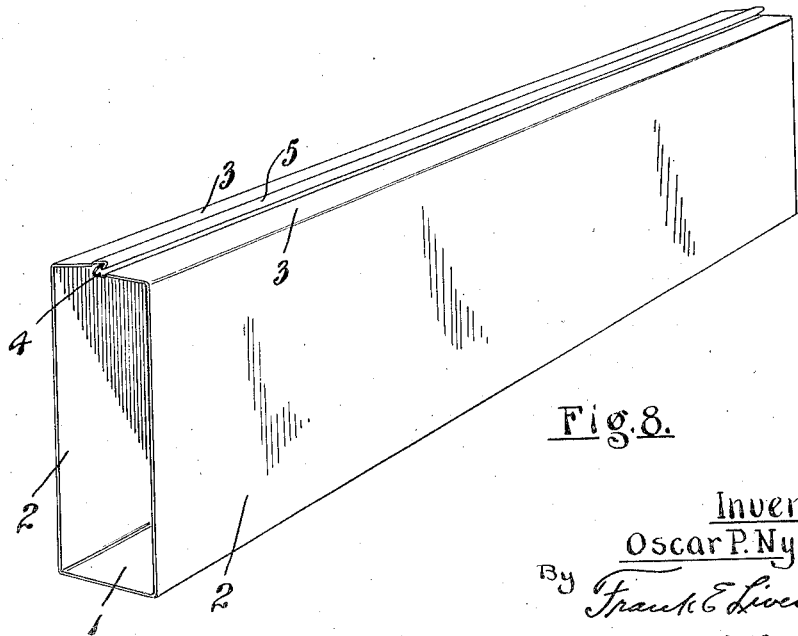
Fig. 8 is a perspective view of a pipe section made by the machine.

The pipe which is to be made from flat sheets of metal in this machine in its finished form as it comes from the machine has a bottom 1, two parallel spaced apart sides 2, and an upper side comprised of two sections 3 bent toward each other, the edges of which are formed with interengaging joint formations, as shown at 4 and 5. These parts 4 and 5 are formed at opposite edges of the flat sheets in another machine and prior to entrance of the sheets into the machine herein shown and after the pipe sections are bent to form they are in position, as shown in Figs. 6 and 8, to be closed together in a subsequent operation to complete the construction of a pipe section.

Figure 1:
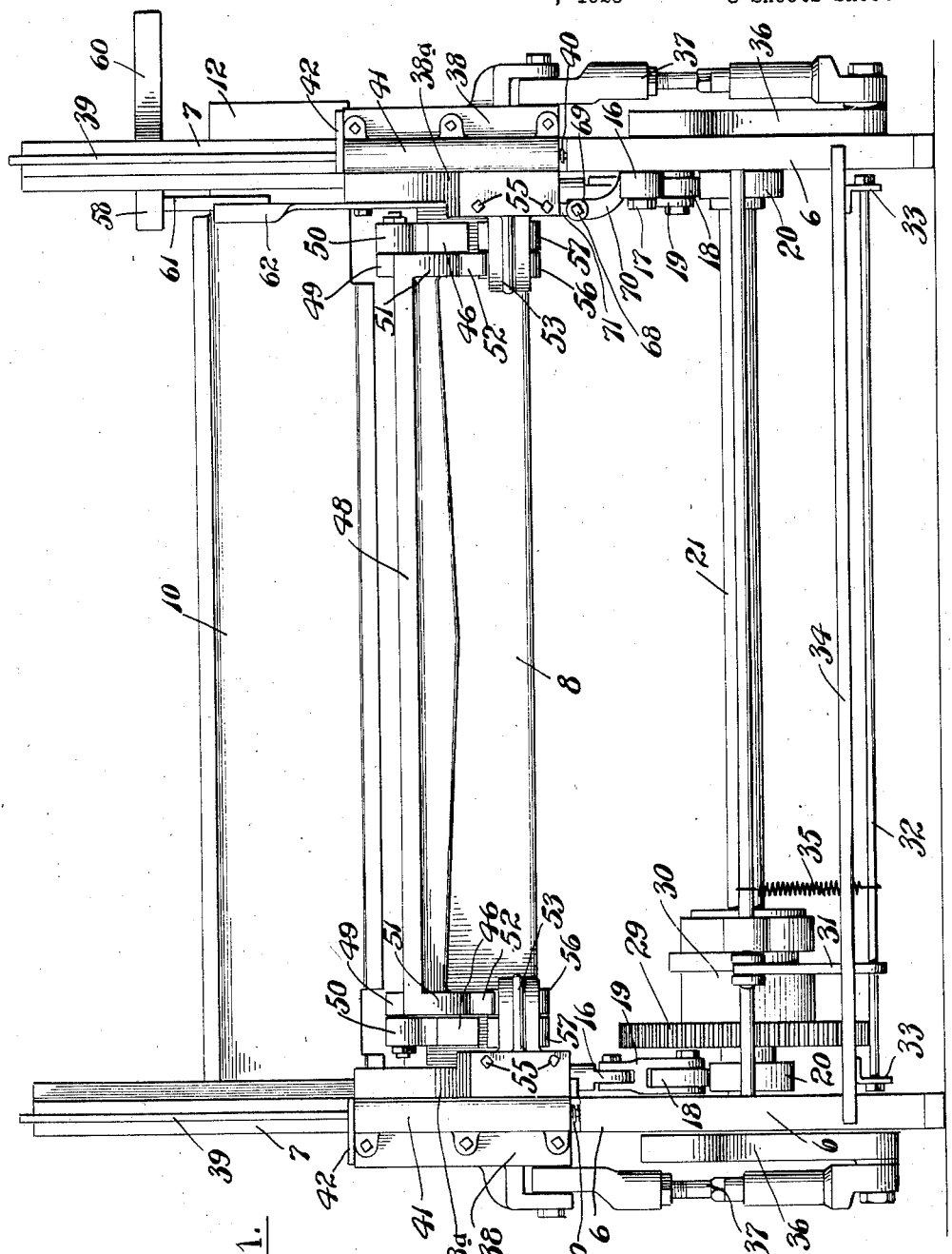

The machine which I have constructed for making these pipe sections includes end supports 6 spaced a distance from each other, each at its upper side having two spaced apart guides 7 extending vertically therefrom. Between the guides at the lower portion thereof, a U-shaped member 8, open at its upper side is horizontally disposed, having flanges 9 at its ends for attachment to the end supports provided between said guides 7. Above the said member 8, a relatively large and heavy I-beam 10 is positioned horizontally, at one end being permanently secured to and between the guides 7 at such end of the machine by means of set screws, a strong cross bar 11 (see Fig. 2) passing above and being secured to the end of the beam 10 and to the guides 7 so that the same is very securely held. The supports 6 and guides 7 are heavy and strong and the bar 11 is also very strong so that the beam 10 is rigidly held in horizontal position. The opposite end is free from connection to the support at such end of the machine and is changed in cross-sectional form, no flanges, as on the I-beam structure being used, and the said end being rectangular in vertical cross-section, as shown in Figs. 1, 9 and 12, at 12.

A bar in the form of a T in cross section having a web 13 and an upper horizontal flange 14 is located over the member 8, the web 13 passing downwardly into the open upper side of the U-shaped member 8. This member is changed in shape at its ends, as indicated at 13$^a$, being rectangular in shape and said ends are guided and held between the lower portions of said guides 7. Pins 15 pass upwardly through the lower side of member 8, adjacent each end thereof and bear against the under sides of the end portions 13$^a$. Said pins 15 are attached to vertical arms of bell-crank levers, the horizontal arms 16 of which are pivotally connected at 17 to the supports 6. A roller 18 is carried on a suitable hanger 19 and is pivotally suspended from the bell-crank levers, there being a roller for each lever, and said rollers bear against cams 20 secured adjacent opposite ends of a shaft 21 mounted horizontally on and between the supports 6. The cams 20, each have a depression in a side thereof in which the rollers normally seat, lowering the pins 15 to lowermost position and consequently lowering the T-shaped bar which rests on said pins. As soon as shaft 21 rotates, it is evident that the rollers are lifted with a consequent elevation of the T-bar so as to move its flange 14 toward the under flanges of the I-beam 10.

The power for operating the machine is applied to a suitable driven pulley 22 secured to a shaft 23 and which is horizontally mounted in suitable brackets 24 on frame supports 6 at the rear sides thereof. A pinion or gear 25 on shaft 23 meshes with a gear 26 on a second shaft 27 mounted in front of shaft 23, and a pinion 28 on the shaft 27 meshes with a gear 29 mounted on shaft 21 and operatively connected with a suitable clutch 30. This clutch 30 is of a well known type like those used in punch presses wherein on tripping the same connection is made between a continuously driven member and a shaft (like shaft 21), the shaft makes one revolution and the connection is automatically broken, so that one complete revolution of the shaft is made and no more. Inasmuch as this is a very well known construction and in itself presents no novel features, it is not specifically shown and described.

To trip the clutch, a link 31 is associated therewith, extending downwardly and connecting with a rod 32 which is carried by and between arms 33, pivotally mounted at their rear inner ends to the end supports 6. A board 34 is disposed between and above the arms 33 and connected thereto, the operator of the machine putting it in operation by stepping on the board, thus tripping the clutch and starting the shaft 21 in movement for its single revolution. A spring 35 connected to the rod 32 and a suitable stationary part of the machine above, normally elevates the board 34, the spring stretching on depression of said board.

Figure 2:
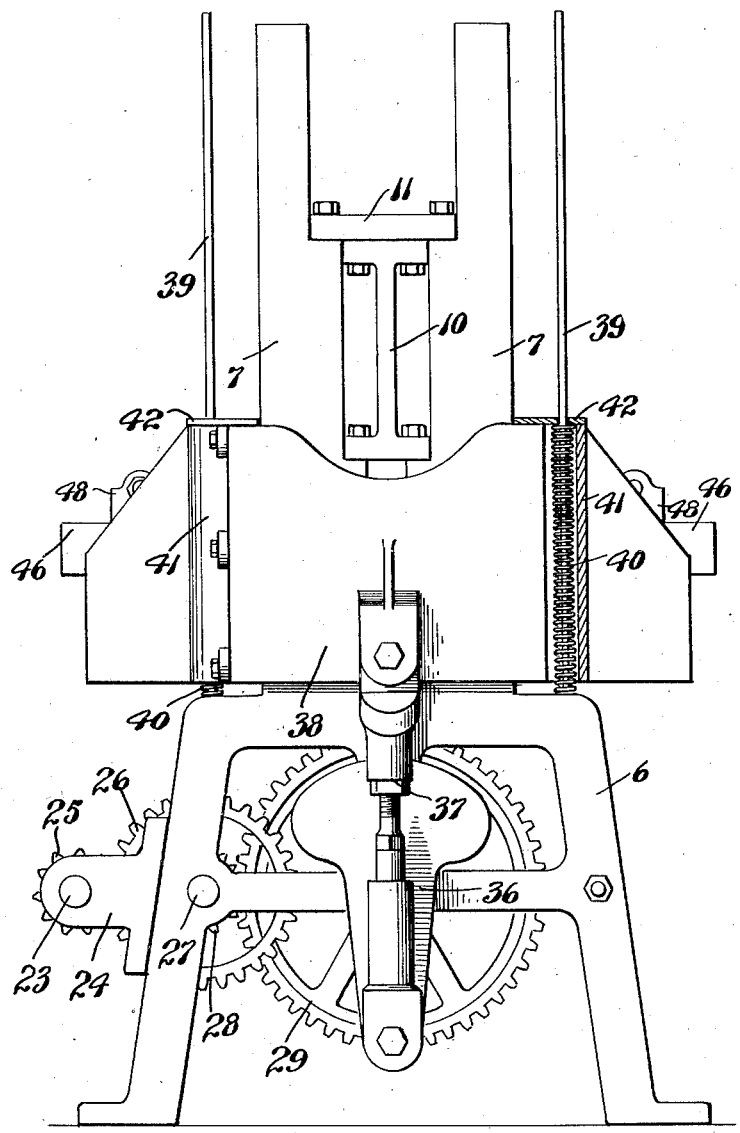
Fig. 2 is an end elevation thereof, with one part in section to show inner construction at such place.
Figure 3:
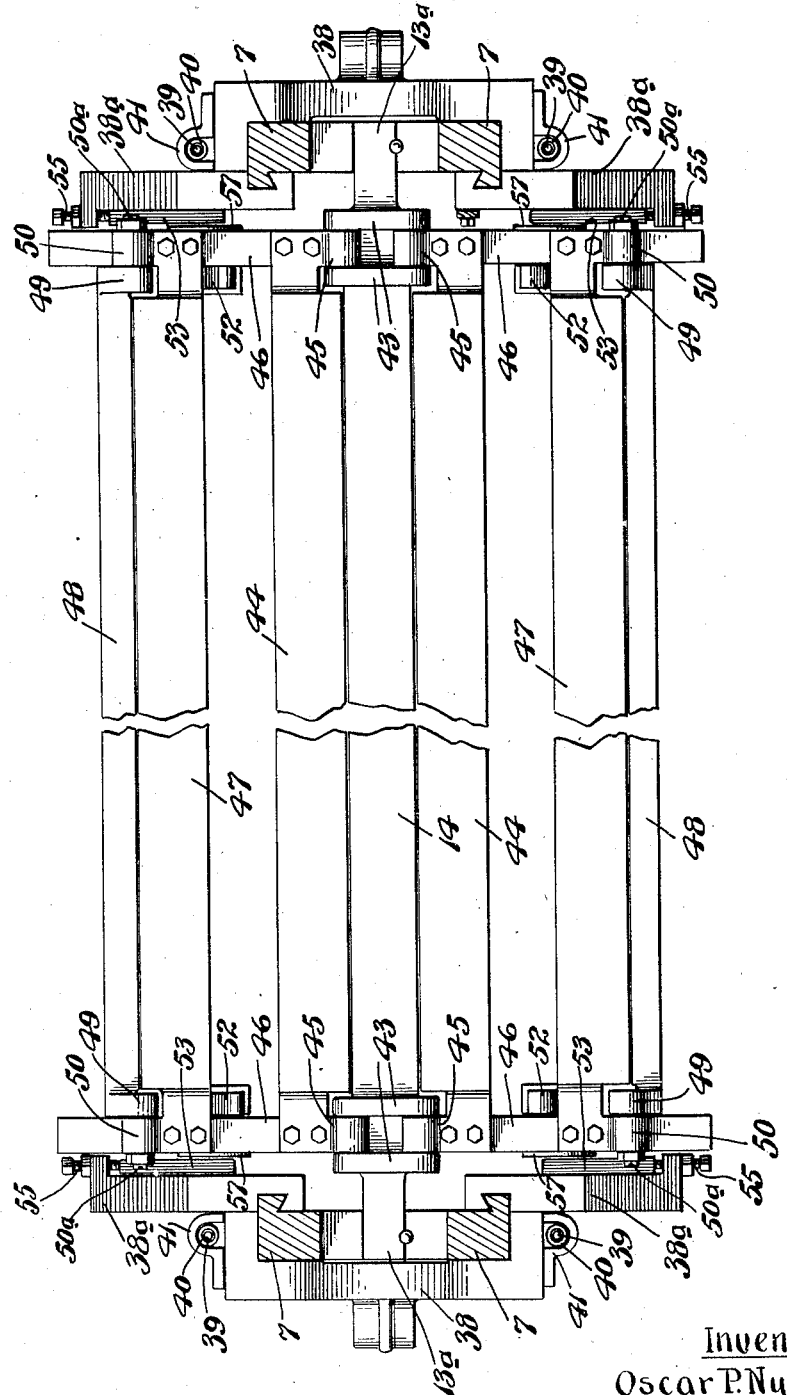
Fig. 3 is a partial horizontal section and plan view of the machine, showing particularly the bending or forming bars which act on the plate of sheet metal to form it into rectangular shape.

A crank arm 36 is attached at each end of the shaft 21 to which a connecting rod 37 is secured at one end, the other extending upwardly and having connection to a member 38 slidably mounted on the guides 7 for vertical movements, it being apparent that with each revolution of the shaft 21, the members 38 are elevated and then returned to lower position, sliding on guides 7 in their vertical movements. At each end of each member 38 and on the inner sides thereof, an extension 38$^a$ is permanently connected, as shown. Rods 39 positioned vertically one at each side of the supports 6 extend upwardly along the ends of the members 38, and a spring 40 is located around each rod, being housed in a housing 41 attached at each end of each member 38, the upper ends of the housings being closed by plates 42. The springs 40 are compressed when the members 38 are in lower position, as shown in Fig. 2, thereby aiding in the elevation of said members when the shaft 21 is rotated, as is evident.

At each end of the flange portion 14 of the T-bar described, two upwardly projecting and spaced apart ears 43 are formed. Paralleling the flange 14 and located alongside each side thereof are bars 44, pivotally connected to the ears 43, the ends of bars 44 being formed with journals 45 adapted to fit between the ears 43 and be pivotally connected thereto. Arms 46 are permanently secured, one to each end of each bar 44 and extend outwardly at right angles thereto. At a distance from each bar 44, other bars 47 are located in parallel relation thereto and are secured at their ends to the arms 46. An additional bar 48 lies alongside the outer side edge of each bar 47 and at each end is formed with an inwardly extending and upwardly projecting journal member 49 to be placed alongside a like projecting member 50 formed at each end of each bar 47 whereby screws 50$^a$ may be passed through the members 50 and formed at their inner ends with tapered bearing ends seating in tapered openings made in the members 49, as shown in Fig. 11. This pivotally connects the bars 48 to the bars 47 at the ends thereof.

The width of the flange 14 is substantially equal to the width of the pipe section which is to be made, or the width of the bottom part 1 of said pipe section. The distance between the inner edge of a bar 44 and the outer edge of the adjacent bar 47 is substantially equal to the width of a side 2 of the pipe to be formed, and the bars 48 are narrow in width, each being less than the width of a part 3 of the pipe made.

Figure 4:
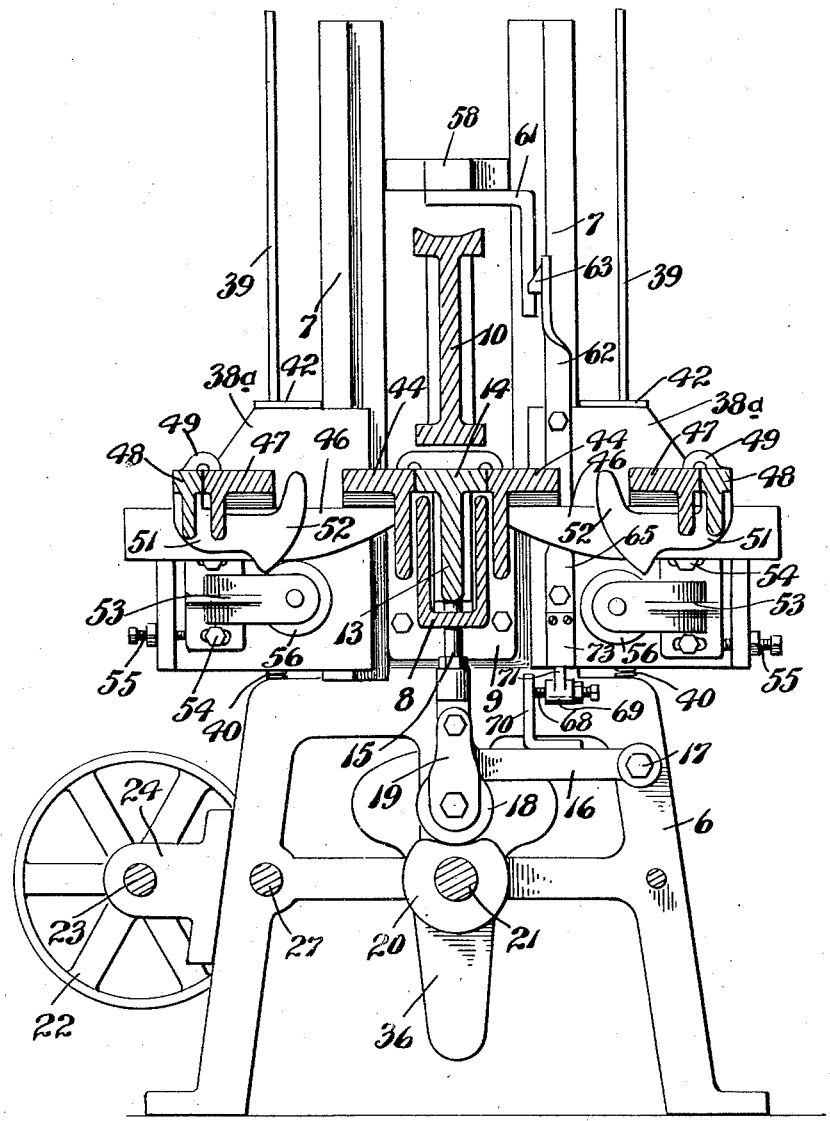
Fig. 4 is a vertical transverse section through the machine with the parts in lower position ready to receive a plate of sheet metal to be bent to form.

At each end of each bar 48 an arm 51 is integrally formed therewith, extending downwardly and then inwardly under the adjacent bar 47 (see Fig. 4), and terminating in a cam head 52 of the shape shown. Under the arms 46 and 51, a bracket 53 is located and secured one to each extension 38$^a$ to the members 38, a suitable set screw and slot connection being made as indicated at 54 for attachment of the brackets with a limited range of adjustment to the parts 38$^a$. Adjusting screws 55 bear on the brackets to hold them in position against outward movement. Two rollers 56 and 57 are rotatably mounted between the ends of the brackets 53 and the inner side of the parts 38$^a$; there being a roller 57 under each arm 46 and a roller 56 at the lower end of the cam side of each head 52, as shown in Fig. 4, when the parts are in their lower position.

Figure 5:
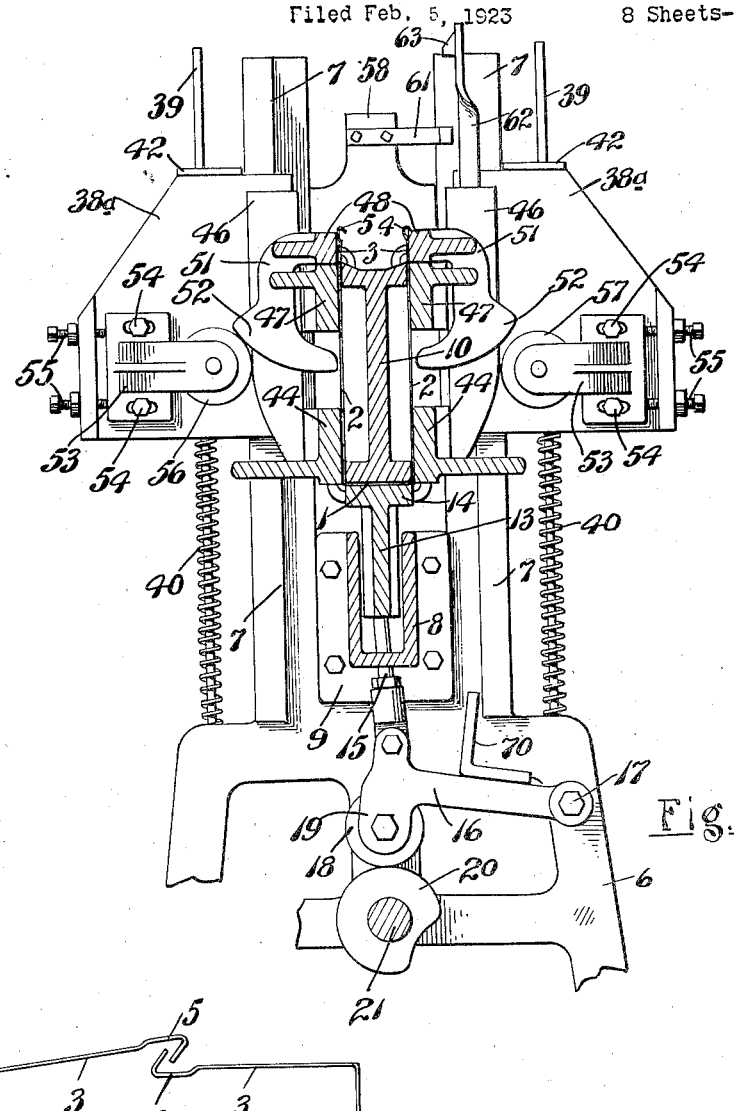
Fig. 5 is a view similar to that shown in Fig. 4, showing the mechanism elevated to the position it takes in the bending of the two longer sides of the pipe section.

With the members 38 in lower position, the arms 46 are positioned horizontally and the upper sides of all of the bars 44, 47 and 48 lie substantially in the same horizontal plane with the upper side of the flange 14 of the T-bar member located over the U-shaped member 8. The arms 46 rest on the rollers 57 thereunder. When in such position, a sheet of metal of the proper width may be placed on the upper sides of these bars and under the I-beam 10, there being sufficient space for the free passage of the metal sheet under the beam 10, as fully shown in Fig. 4. When properly located on the bars, the operator depresses the trip mechanism by stepping on board 34 whereupon the shaft 21 makes a single complete revolution. The initial effect is to elevate the pins 15, as previously described, thereby elevating the T-bar so that its flange 14 presses and clamps the middle portion of the metal sheet tightly against the under flange of the beam 10. Following this, the crank arms 36 and connecting rods 37 attached thereto elevate the members 38 and attached parts, whereupon the rollers 57 riding against the under sides of the arms 46 serve to turn the same to a vertical position, as shown in Fig. 5, the bars 44 turning on their pivotal connections at 45. This serves to bend the sides 2 at right angles to the bottom 1, said sides 2 being brought against the side edges of the flanges of the beam 10 and held thereagainst by bars 44 and 47.

Figure 7:
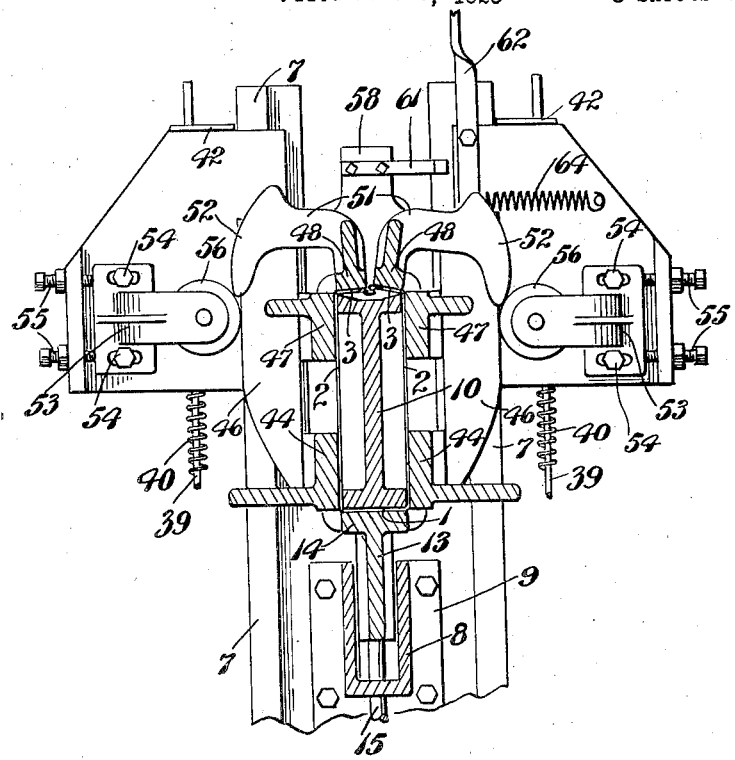
Fig. 7 is a fragmentary vertical section similar to that shown in Figs. 4 and 5 and illustrating the position of the parts during the completion of the final step in the formation of pipe.

Immediately following the upward bending of the sides 2, and as a continuation of the upward movement of the members 38, the rollers 56 engage the cam edges of the heads 52 on arms 51, whereupon the bars 48 are turned on their pivots 50$^a$ to the position shown in Fig. 7, thereby bending the sections 3 toward each other over the upper corners of the beam 10 and completing the forming of the pipe section so far as possible on the machine of this character. It will be noted (see Fig. 7) that the left bracket 53 is slightly elevated above the right bracket. This causes the left section 3 to be bent inwardly slightly ahead of the right section 3 so that part 4 comes under part 5 ready for clinching engagement.

After the pipe section is formed it is removed from the beam 10, or the core around which it is made by sliding it lengthwise over the free end of said beam. It is evident that in the forming of the pipe section, this free end of the beam must be supported and held against change of position otherwise the product will be imperfect. Accordingly I have provided a holding member 58 which is pivotally mounted at 59 (see Fig. 12) between two of the guides 7 so as to be positioned over the end 12 of the beam 10; and said member 58 is formed at one end portion with spaced apart arms 60 adapted in one position of the member to pass one at each side of the end 12 of the beam, while the part of the member 58 above said arms 60 comes against the upper side of the end 12. In this position the free end of the beam 12 is very securely held and reinforced against the strains to which the beam is subjected in forming the pipe.

It is designed that the member 58 shall automatically engage with the end of the beam 10 at the initiation of the cycle of movements, and as soon as the pipe is formed, or at the return of the parts to initial position at the completion of the cycle, the member is automatically disconnected from said beam so that the formed pipe section may be removed. These effects are accomplished by the following constructions:

A bar 61 is attached to the end of the member 58 and has a free end portion turned at right angles to the part that is attached to the member 58, said free end portion being adapted to be positioned vertically when the member 58 is turned to horizontal beam disengaging position, as shown in Figs. 1 and 4. In such position it lies alongside the upper portion of a bar 62 which is pivotally mounted between its ends on one of the parts 38ª, being provided with an inwardly extending latch lug 63 at its upper end which interposes in the path of movement of the end portion of the angle member 61, normally holding the member 58 in inoperative horizontal position. As soon as the latch lug is moved to one side to free the member 61, the member 58 turns through gravity so that the arms 60 thereof embrace the end 12 of the beam 11. A spring 64 is connected with the lower end of the bar 62, the effect of which is to yieldingly hold the upper end of the bar and its latch lug 63 in position to engage with the member 61 normally.

Below the bar 62 and in substantial alinement therewith is a second bar 65 also pivotally mounted on the part 38ª between its ends, the upper end of said bar 65 having a reduced end 66 which at its extremity fits into a socket 67 formed at the lower end of the bar 62. A screw 68 passes through a sleeve 69 and bears against an upwardly projecting arm 70 fastened to the upper side of the horizontal arm of the bell crank 16. Sleeve 69 is located at the lower end of a short bar 71 pivotally mounted at 72 at its upper end at the lower end and at one side of the bar 65, the axis of the pivot 72 being at right angles to the pivotal axis of the bar 65. The bar 71 is normally forced into alinement with the bar 65 by the leaf spring 73, best shown in Fig. 13. It will be noted that the upper end of the arm 70 is curved, as indicated at 70ª, the purpose of which will later appear.

With this arrangement, as soon as the shaft 21 has turned sufficiently to elevate the pins 15 with an upward turning of the horizontal arm of the lever 16, the arm 70 secured to said lever is moved to one side acting against the end of the screw 68 to turn lever 65 about its pivot, with a simultaneous turning of the bar 62 about its pivot in the opposite direction, this moving the latch lug 63 away from the member 61, freeing the member 58 and allowing it to fall to operative engaging position to hold the free end of the beam 10. The continued rotation of the shaft 21 elevates the members 38 and attached parts so that the end of screw 68 very soon is lifted above the arm 70 and the bars 62 and 65 assume their normal vertical position under the influence of spring 64, a stop 64ª being placed so as to prevent too far movement of the bars. In the elevation of the parts, the latch lug 63 comes to the member 61 and passes above it, the inclined upper side of the latch lug serving to move the upper end of the bar 62 outward to permit the passage of the lug by the member 61. The pipe is formed on the upward movement of the members 38 and attached parts. On the downward movement, or on the return to original position, the under side of the lug 63 comes against the upper side of the member 61 and serves to draw the same downward, moving the member 58 to horizontal position and away from the free end of the beam 10. The arm 70 is still in its position that it was moved to to unlatch the member 61, and the projecting portion of the screw 68 in the downward movement of the parts comes against the rounded or curved upper end 70ª of the arm 70, thereby swinging the arm 71 outwardly against the spring 73, as shown in Fig. 13, so that the screw 68 passes alongside an edge of the arm 70 until the cycle is completed by the seating of the rollers 18 in the depressions in cams 20, whereupon the arm 70 comes back to normal position and the end of the screw 68 is freed to come to its original position at the outer side of the arm 70. By this construction and operation, the holding member 60 is automatically freed to drop into engagement with the free end of the beam 10 and operatively engage therewith during the time the pipe is being formed, and is then automatically returned to its original inoperative position so as to be out of the way so that the formed section of pipe may be taken longitudinally from the beam; and the machine is ready to repeat the same cycle of operations for the forming of the next succeeding section of pipe having rectangular cross section.

From the foregoing it is apparent that a practical and operative machine is made fully capable of forming sheet metal pipe sections having rectangular shape in cross section, and that such forming may be rapidly done, the operation of the machine after the plate of sheet metal has been put therein being very rapid, the whole cycle of opations occurring while the shaft 21 is making one revolution. For furnace work, the distance between the sides of the pipe remains the same irrespective of the different widths that may be desired, so that for a different width, but slight alteration or adjustment of the machine is required. For a wider pipe section, a bar for the increase of width is or may be attached to the upper side of and lengthwise of the beam 10, the bars 47 with attached bars 48 moved outwardly on the arms 46 the necessary distance, and the crank 36 and connecting rod 37 at each end of the machine replaced by longer ones. Otherwise the machine does not need to be changed. Accordingly, the machine is exceptionally useful in furnace manufacture, inasmuch as pipes or stacks having rectangular form are needed in large amounts for furnace installation in houses of more than one story. The invention is defined in the claims appended hereto, and it is to be considered that all forms of structure coming within their scope are comprehended by the invention.

I claim:

1. In a machine of the class described, an elongated core, means for rigidly holding the core at one end, the remainder of the core being free, means for bending a sheet of metal around the core, means automatically released immediately prior to the bending of the metal to engage with and hold the free end of the core, and means operating to automatically disengage said holding means from the core after the bending operation has been completed, substantially as described.

2. In a machine of the class described, an elongated core, means for rigidly supporting the same at one end to leave the remainder of the core free, a bar paralleling the core at one side and normally spaced a short distance from the core whereby a sheet of metal may be introduced between the core and bar, means for moving the bar toward the core to clamp the middle portion of the metal sheet between them, means automatically released with the movement of the bar toward the core to engage with and hold the free end of said core, means for bending the metal at each side of the clamped portion around the remainder of the core, and means acting to automatically disengage said holding means from the core after the bending operation has been completed.

3. In a machine of the class described, an elongated core, means to which one end of the core is rigidly attached, the remainder of the core being free, a member pivotally mounted adjacent the free end of the core and dropping by gravity into holding engagement when free to do so, means for holding said member in inoperative position, means for bending a sheet of metal around the core, means automatically releasing the said member immediately prior to the bending of the metal, and means for automatically moving said member out of engagement with the core immediately after the metal has been bent around the core, substantially as described.

4. In a machine of the class described, a support, a core mounted horizontally on said support and permanently secured thereto at one end, the remainder of the core being free, a horizontally mounted shaft, means for driving said shaft, means for connecting said driving means with the shaft to turn it one complete revolution, a bar movably mounted under the core, means interposed between the shaft and bar for elevating the bar toward the core to clamp a sheet of metal introduced between the core and bar, means actuated by the shaft for bending the sheet of metal around the core, and movably mounted means for engaging with the free end of the core to hold the same during said bending operation, said means being movable to disengage from the core after the bending operations have been completed.

5. In a machine of the class described, a support including two spaced apart end frames, a pair of vertical guides extending upwardly from each frame, a U-shaped connecting member between the end frames, a bar mounted movably over said U-shaped member, a core attached to the guides at one end of the machine and located over the bar, means for elevating the bar into close relation to the under side of the core whereby a sheet of metal may be clamped between them, members slidably mounted on the guides, means for reciprocating said members immediately after the elevation of said bar, and metal bending means actuated by the upward movement of said members for bending the metal around the core, substantially as described.

6. In a machine of the class described, a support including two spaced apart frames, a pair of vertical guides extending upwardly from each frame, a core permanently connected at one end to one of the pairs of guides, a holding member pivotally mounted between the guides of the other of said pair of guides and adapted to engage with the free end of the core when free to do so, means normally holding said holding member out of engagement with the core, members slidably mounted on the guides, means for reciprocating said members from lower to upper position and back to lower position, means for releasing said holding member holding means at the beginning of the upward movement of the reciprocating members to permit the holding member to engage with the core, metal bending means actuated by the upward movement of said slidably mounted members for bending a sheet of metal around the core, and means for moving said holding member out of engagement with the core on the downward movement of the reciprocating members, substantially as described.

7. In a machine of the class described, a support including two connected end frames spaced a distance from each other, a pair of vertical guides extending upwardly from each frame, a core attached at one end to one of the pairs of guides, said core being horizontally positioned, a member slidably mounted on each of the pairs of guides, a rotatably mounted shaft, a crank at each end of the shaft, a connecting rod connecting the said cranks and slidable members, means for driving the shaft through a single revolution, and metal bending and forming means actuated by the movements of the said slidable members for bending and forming a sheet of metal around the core, substantially as described.

8. A construction containing the elements in combination defined in claim 7, combined with movable means for holding the opposite end of the core during the time the sheet of metal is being bent and formed, and means for moving the said movable means out of engagement with the core actuated by movement of one of said sliding members after the metal has been bent around the core, substantially as described.

9. In a machine of the class described, a support including two end frames connected together in spaced apart relation, a pair of vertical guides extending upwardly from each end frame, a core connected permanently at one end to one of said pair of guides and having the opposite end free, a holding member pivotally mounted between the other guides and normally dropping by gravity to engage and hold the free end of the core when free to do so, members mounted for vertical movements, one on each pair of guides, means for elevating said members and returning them to lower position, a latch for normally holding the holding member in inoperative position, means for releasing said latch at the beginning of the upward movement of said vertically moving members to permit the holding member to engage with the core, metal bending and forming means actuated by said members on their upward movement for bending and forming a sheet of metal around the core, and means engaging with the holding member on the downward movement of said vertically moving members to move it to inoperative position, disengaged from the core, substantially as described.

10. In a machine of the class described, a horizontally positioned core, means for firmly carrying the same at one end, a bar movably mounted under and in parallelism with the core, a sheet of metal being adapted to be placed between the bar and core, means for elevating the bar to clamp the sheet of metal against the core, arms pivotally mounted at each side and at each end of the said bar, additional bars connecting the arms on the same side of the first bar and lying with their upper surfaces in the same plane, means for turning said arms and attached bars upwardly along the sides of the core after elevation of the first bar, a still further bar pivotally connected to each of the outermost bars on said arms, and means for turning said further bars inwardly toward each other after said arms have been turned upwardly, whereby the sheet of metal is bent into shape to conform to the core and around the same, substantially as described.

11. A construction containing the elements in combination defined in claim 10, combined with a movably mounted member normally held out of engagement with the core, means for releasing said member substantially simultaneously with the elevation of said first bar to permit engagement of the member with the free end of the core, and means for moving said member to first inoperative position after the said sheet of metal has been bent to form.

12. In a machine of the class described, spaced apart end frames, a pair of vertical guides on each end frame, a U-shaped horizontal member connecting the end frames at the lower portions of the guides, a bar located in and extending above the U-shaped member, a shaft rotatably mounted below said member, means for rotating said shaft through a single revolution, a cam having a depression in one side thereof attached adjacent each end of the shaft, a bell-crank lever including a vertical and a horizontal arm pivotally connected to each end frame at the outer end of the horizontal arm, a pin attached to the upper end of each vertical arm of the levers and passing through the bottom of the U-shaped member to engage against the under side of the bar, a hanger having a roller mounted thereon connected to each of the levers, said roller bearing against the cams and normally seating in the depressions thereof, members mounted for sliding movement, one on each pair of guides, a core in the form of an I-beam connected at one end to one of the pairs of guides and located horizontally over the bar, a crank at each end of the shaft, a connecting rod connecting the said cranks with the sliding members above, and means pivotally connected to the said bar at each side thereof and means on the sliding members actuating the same to turn said means upwardly alongside the sides of the core on upward movement of said sliding members, substantially as described.

13. A construction containing the elements in combination defined in claim 12, combined with a member pivotally mounted to turn on a horizontal axis between the pair of guides at the unattached end of the core, said member normally dropping by gravity when free to do so to engage with and hold the free end of the core, latch means mounted on one of said sliding members normally engaging with said last mentioned member to hold it out of engagement with the core, said latch means being released on upward movement of the said bar, means on one of the bell-crank levers for releasing the latch means on elevation thereof on rotation of the cam on the shaft associated therewith, said latch means moving upward with the sliding member to which it is attached whereby on downward movement it engages with said holding member and moves to disengaged position.

14. In combination, a horizontally positioned core, a bar located under and paralleling the core, arms pivotally connected one at each end and at each side of the bar and extending outwardly at right angles thereto, two additional bars paralleling the first bar at each side thereof and attached to the arms at each side of the first bar, a third bar paralleling and pivotally connected at its ends to the outermost of each of said two additional bars, a member mounted for vertical sliding movements at each end of the core, rollers on said members on which the arms rest, downwardly extending arms terminating in cam heads secured to each end of the third bars, other rollers on said members on which the said heads bear, and means for elevating the first bar toward the core and thereafter elevating the sliding members and returning them to initial position, substantially as and for the purposes described.

In testimony whereof I affix my signature.

OSCAR P. NYSTROM.